United States Patent
Lee et al.

(10) Patent No.: US 7,206,061 B2
(45) Date of Patent: Apr. 17, 2007

(54) MASK SUPPORTING APPARATUS USING VACUUM AND LIGHT EXPOSING SYSTEM, AND METHOD USING THE SAME

(75) Inventors: Chang-Won Lee, Kwangju (KR); Yong-Hui Bae, Yongin (KR)

(73) Assignee: DMS Co., Ltd. (KR)

( * ) Notice: Subject to any disclaimer, the term of this patent is extended or adjusted under 35 U.S.C. 154(b) by 113 days.

(21) Appl. No.: 10/967,367

(22) Filed: Oct. 18, 2004

(65) Prior Publication Data

US 2005/0105074 A1 May 19, 2005

(30) Foreign Application Priority Data

Nov. 13, 2003 (KR) ...................... 10-2003-0080249

(51) Int. Cl.
*G03B 27/62* (2006.01)
*G03B 27/58* (2006.01)
(52) U.S. Cl. .......................................... 355/75; 355/72
(58) Field of Classification Search .................. 355/53, 355/72–76; 430/5, 20, 30; 310/10, 12
See application file for complete search history.

(56) References Cited

U.S. PATENT DOCUMENTS

| | | | | |
|---|---|---|---|---|
| 4,054,383 A | * | 10/1977 | Lin et al. | 355/91 |
| 6,529,266 B1 | * | 3/2003 | Sandstrom | 355/72 |
| 6,760,094 B2 | * | 7/2004 | Shimada | 355/53 |
| 6,822,731 B1 | * | 11/2004 | Laganza et al. | 355/75 |

FOREIGN PATENT DOCUMENTS

JP          360146674 A   *   8/1985

* cited by examiner

*Primary Examiner*—Henry Hung Nguyen
(74) *Attorney, Agent, or Firm*—Barnes & Thornburg LLP (57) ABSTRACT

A mask supporting apparatus includes an absorption glass provided with at least one vacuum hole, a mask provided with a predetermined pattern and attached on a bottom surface of the absorption glass, and an absorption pad disposed between the absorption glass and the mask to define a space between the absorption glass and the mask. Air in the space is exhausted through the vacuum hole to securely fix the mask on the absorption glass.

11 Claims, 9 Drawing Sheets

FIG.1

PRIOR ART

MASK SUPPORTING APPARATUS USING VACUUM AND LIGHT EXPOSING SYSTEM, AND METHOD USING THE SAME

BACKGROUND OF THE INVENTION a) Field of the Invention

The present invention relates to a mask supporting apparatus and a light exposing system, and a method using the same, and more particularly, to a mask supporting apparatus that can securely support a mask using vacuum to improve uniform flatness, thereby enhancing patterning precision, and to an exposing system and method using such a mask fixing apparatus.

b) Description of the Related Art

In recent years, flat panel displays such as a liquid crystal display (LCD) have been widely employed to a variety of applications such as personal computers and TVs. As is well known, the LCD comprises a thin film transistor (TFT) substrate, a color filter substrate, and a liquid crystal layer between the TFT substrate and the color filter substrate. Here, the elements such as the TFT, pixel electrodes, and the color filter are formed through a well known photolithography process.

As a size of the LCD is enlarged, it is a general tendency that a size of a mask used for patterning the elements on the substrate as well as a size of the substrate is enlarged.

As the mask is large-sized, a drooping phenomenon is incurred which makes it difficult to precisely form a pattern on the substrate during a light exposing process.

Accordingly, to address this problem, a light exposing apparatus with a special fixing unit for fixing the large-sized mask has been developed.

Figure 1:
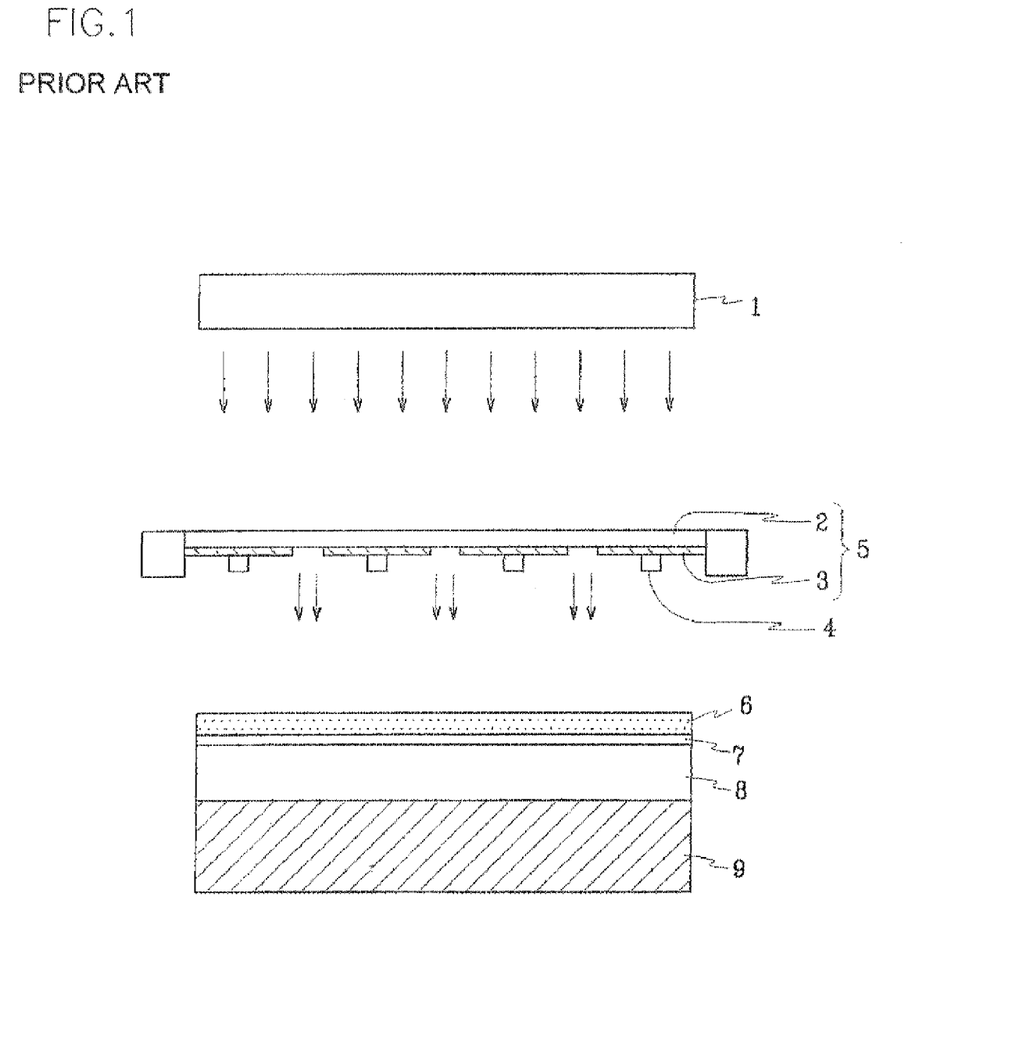
FIG. 1 is a sectional view of a conventional mask supporting apparatus.

FIG. 1 shows a conventional light exposing system.

As shown in the drawing, a conventional light exposing system comprises a light source 1, a mask 5 provided with a predetermined pattern 3 and disposed under the light source 1, a plurality of bars 4 for supporting the mask 5, and a mounting base for mounting a display substrate on which a predetermined pattern will be formed by light passing through the mask 5.

Light emitted from the light source 1 transmits on a transparent glass 2 and the pattern 3 of the mask 5, and reaches the display substrate 8. Then, the predetermined pattern is formed through an etching process.

However, a method for supporting the large-sized mask using the bars still has a limitation in effectively supporting the mask.

Furthermore, since the light emitted from the light source may be refracted by the bars, the patterning precision may be deteriorated.

SUMMARY OF THE INVENTION

The present invention has been made in an effort to solve the above-described problems of the prior art.

Accordingly, it is an objective of the present invention to provide a mask supporting apparatus that can effectively support a large-sized mask without using bars but rather using vacuum, and to provide a light exposing system and method using such a mask supporting apparatus.

It is another objective of the present invention to improve the patterning precision by preventing light refraction by supporting a mask without using supporting members.

To achieve the above objective, the present invention provides a mask supporting apparatus comprising an absorption glass provided with at least one vacuum hole; a mask provided with a predetermined pattern and attached on a bottom surface of the absorption glass; and an absorption pad disposed between the absorption glass and the mask to define a space between the absorption glass and the mask, wherein air in the space is exhausted through the vacuum hole to securely fix the mask on the absorption glass.

In another aspect of the present invention, there is provided a light exposing system comprising a display panel mounting base; an absorption glass provided with a vacuum hole and detachably mounted on an upper portion of the base and connected to a vacuum line through the vacuum hole; a fixing jig for supporting the absorption glass; and a light source disposed above the absorption glass, wherein when a mask is disposed under the absorption glass, the mask is securely fixed on the absorption glass by a vacuum developed through the vacuum line.

In still another aspect of the present invention, there is provided a light exposing method using a light exposing apparatus having an absorption glass provided with a vacuum hole and supported on a fixing jig, the method comprising the steps of aligning a mask having a predetermined pattern on an approaching position to a bottom surface of the absorption glass; attracting the mask on the absorption glass through the vacuum hole; and emitting light to the substrate via the mask.

BRIEF DESCRIPTION OF THE DRAWINGS

The accompanying drawings, which are included to provide a further understanding of the invention and are incorporated in and constitute a part of this application, illustrate embodiment(s) of the invention, and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 2:
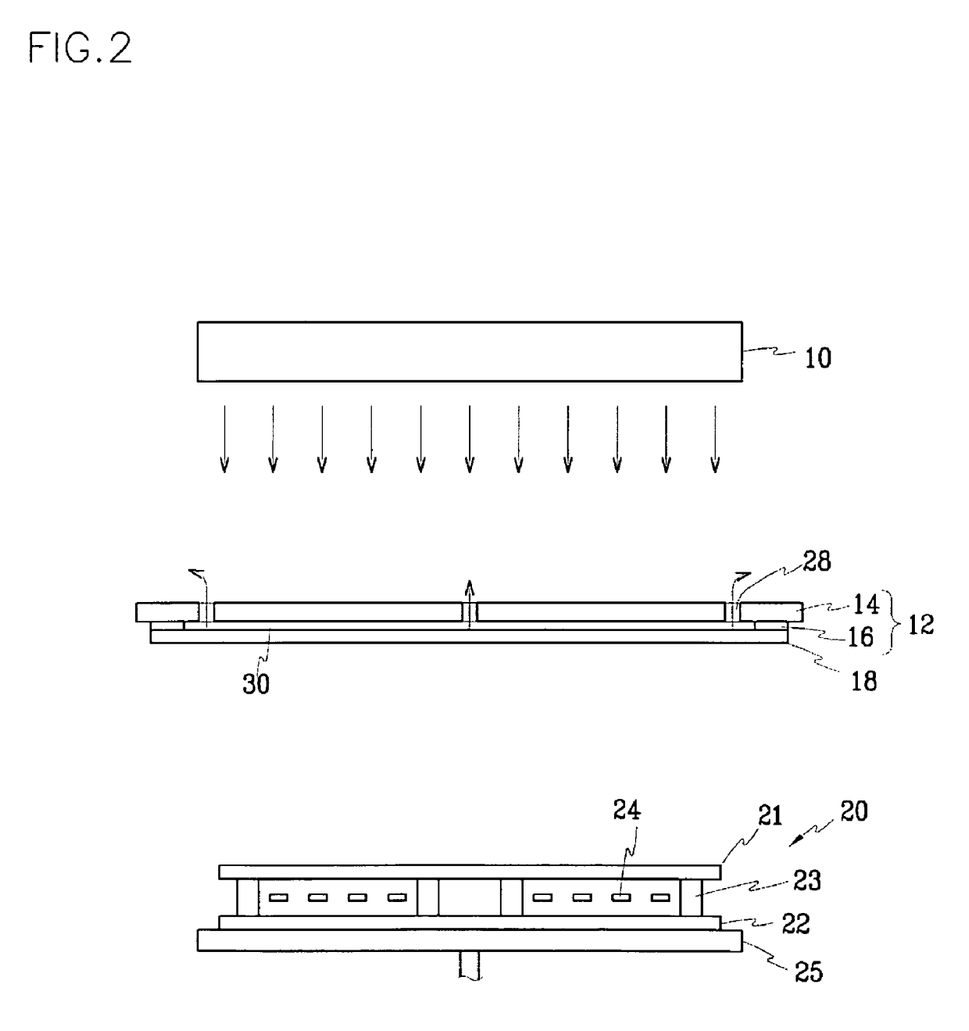
FIG. 2 is a sectional view of a light exposing system where a mask supporting apparatus according to an embodiment of the present invention is applied.
Figure 3:
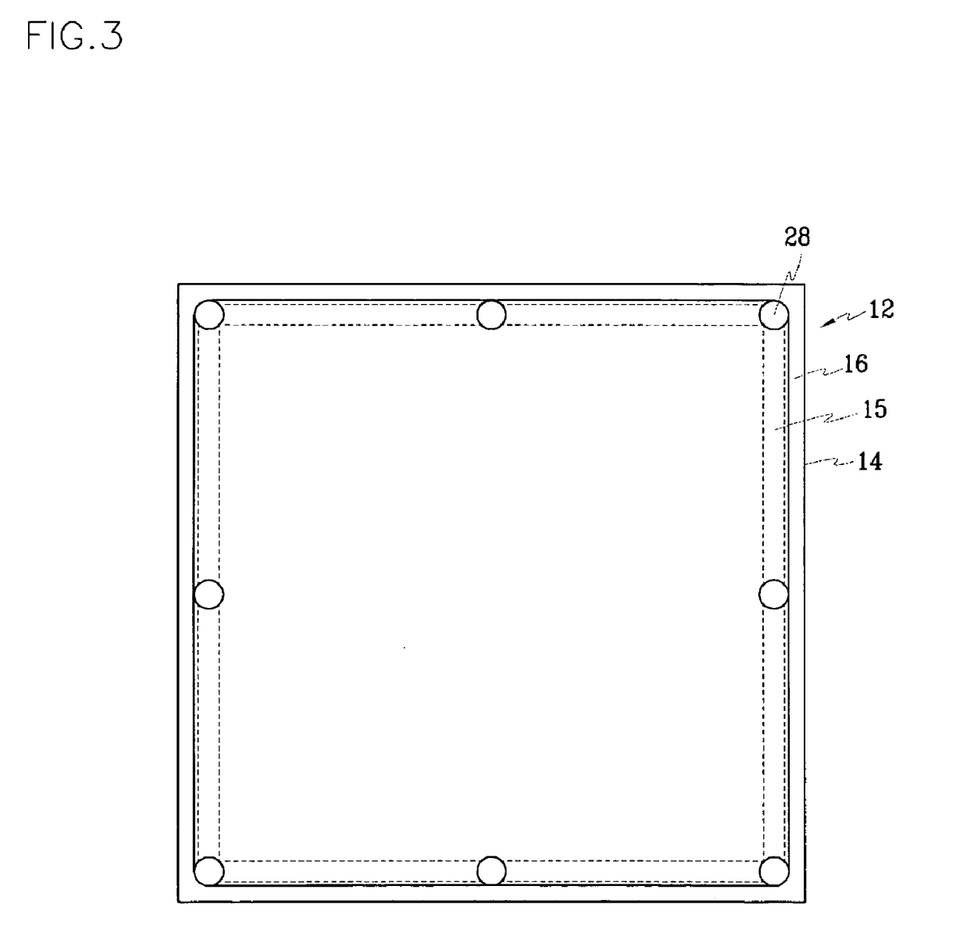
FIG. 3 is a bottom view of a groove formed on an absorption glass of a mask supporting apparatus depicted in FIG. 2.

Referring to FIGS. 2 and 3, the inventive light exposing system comprises a light source 10, a mask supporting unit 12 for supporting a mask 18 provided with a predetermined pattern and disposed under the light source 10, and a display substrate mounting base 25 for mounting a display substrate on which a predetermined pattern will be formed by light passing through the mask 18.

The mask supporting unit 12 comprises an absorption glass 14 provided with at least one vacuum hole 28, a mask 18 attached on a bottom of the absorption glass 14 and provided with the predetermined pattern, and an absorption pad 16 formed to define a space between the absorption glass 14 and the mask 18.

The absorption glass 14 is formed of a transparent material such as quartz, glass, so as to effectively allow the light emitted from the light source to pass therethrough.

The vacuum holes 28 are formed on an edge of the absorption glass 14. The vacuum holes 28 are connected to each other by a groove 15 so that air can flow therebetween. A vacuum pump (not shown) is connected to the vacuum hole 28 to perform a vacuuming operation.

The mask 18 is formed of a substrate through which ultraviolet rays can pass. A light shielding pattern for shielding the light emitted to the mask 18 is formed on the mask 18.

Accordingly, the substrate 20 is exposed to the light passing through the mask 18 with the light shielding pattern.

The light exposing process is performed for a photoresist process for patterning a photosensitive layer. In addition, the light exposing process is performed to harden the seal material used to attach the TFT substrate 22 and the color filter substrate 21.

The absorption pad 16 may be attached along an edge of the absorption glass 14. That is, an upper surface of the absorption pad 16 is attached on a bottom surface 14 of the absorption glass 14, and the mask 18 is attached on a lower surface of the absorption pad 16.

Accordingly, the space 30 is defined by the absorption pad 16 between the absorption glass 14 and the mask 18.

In the above state, the vacuum pump is connected through the vacuum holes 28 so that the air in the space 30 can be exhausted through the vacuum holes 28, thereby developing a vacuum in the space 30.

As a result, the absorption force by the vacuum attracts the mask 18 to the absorption glass 14, thereby securely supporting the mask 18.

Figure 4:
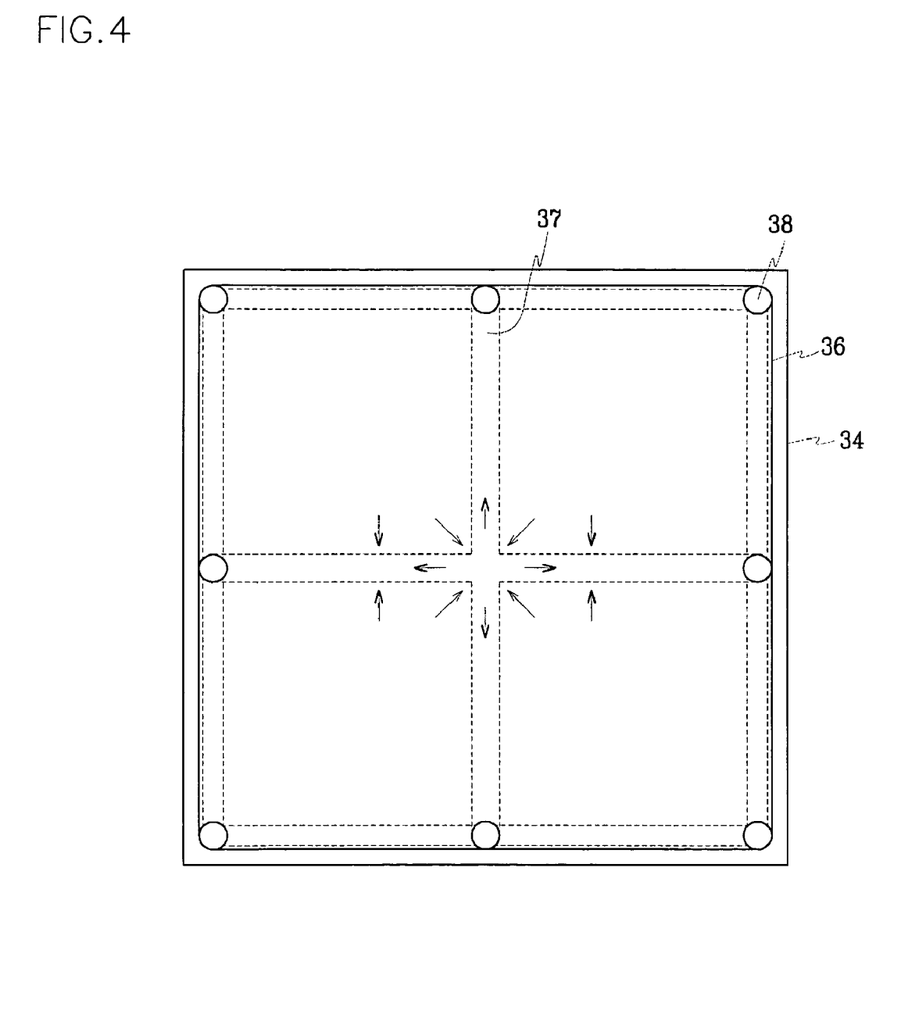
FIG. 4 is a bottom view of a modified example of FIG. 3.

In the vacuuming work, since the air on a central portion of the space 30 is moved to the vacuum holes 28 and is then exhausted to an external side, the airflow time may be prolonged. To shorten the airflow time, as shown in FIG. 4, grooves 37 may be formed in lateral and longitudinal directions. That is, the grooves 37 are formed in the lateral and longitudinal directions on the bottom surface of the absorption glass 34, connecting the vacuum holes 38.

Accordingly, when the vacuuming work is performed by connecting the vacuum pump to the vacuum holes 38, the air in the space 30 between the absorption glass 34 and the mask 18 can be quickly exhausted through the vacuum holes 38 via the lateral and longitudinal grooves 37.

Figure 5:
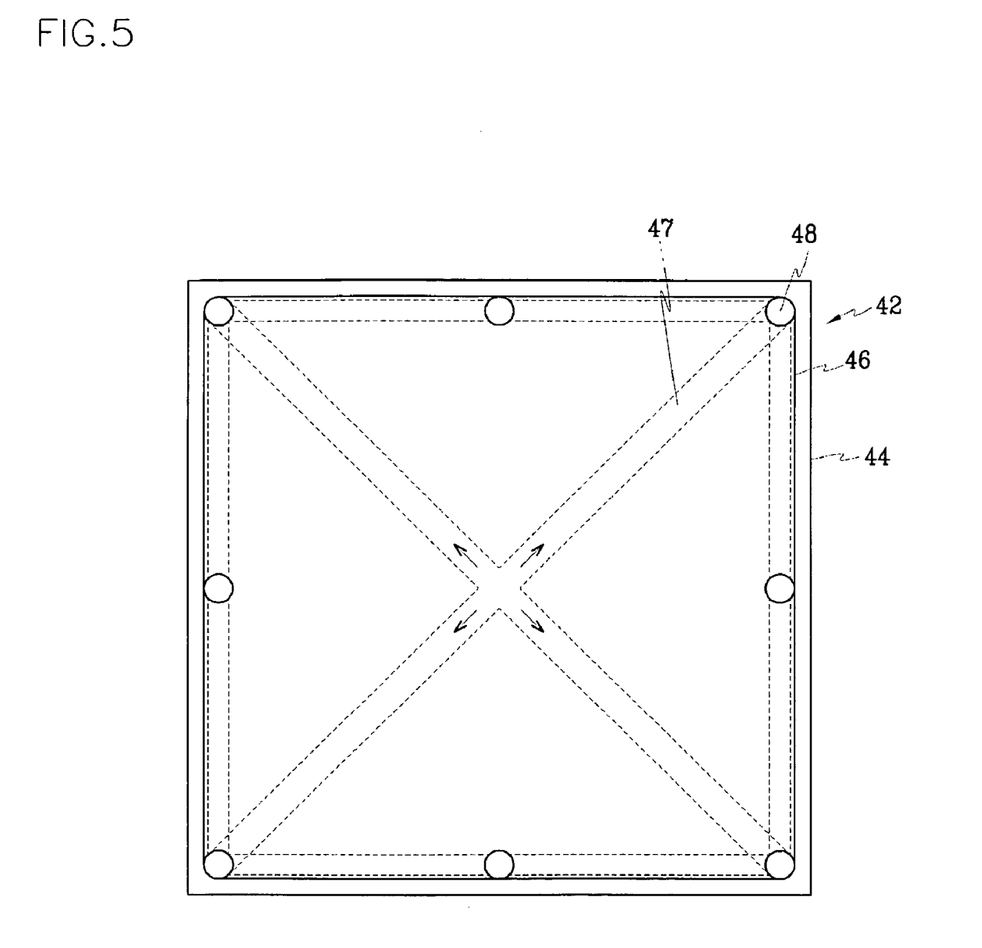
FIG. 5 is a bottom view of another modified example of FIG. 3.

Alternatively, the grooves 37 may be diagonally formed as shown in FIG. 5. That is, the grooves 47 are formed in diagonal directions on the bottom surface of the absorption glass 44 to connect the vacuum holes 48.

Accordingly, when the vacuuming work is performed by connecting the vacuum pump to the vacuum holes 48, the air in the space 30 between the absorption glass 34 and the mask 18 can be quickly exhausted through the vacuum holes 48 via the diagonal grooves 37.

Meanwhile, although the absorption pad 16 may be formed along the edge of the absorption glass 14 as shown in FIG. 3, the absorption pad can be formed to function as the grooves (37, 47).

Figure 6:
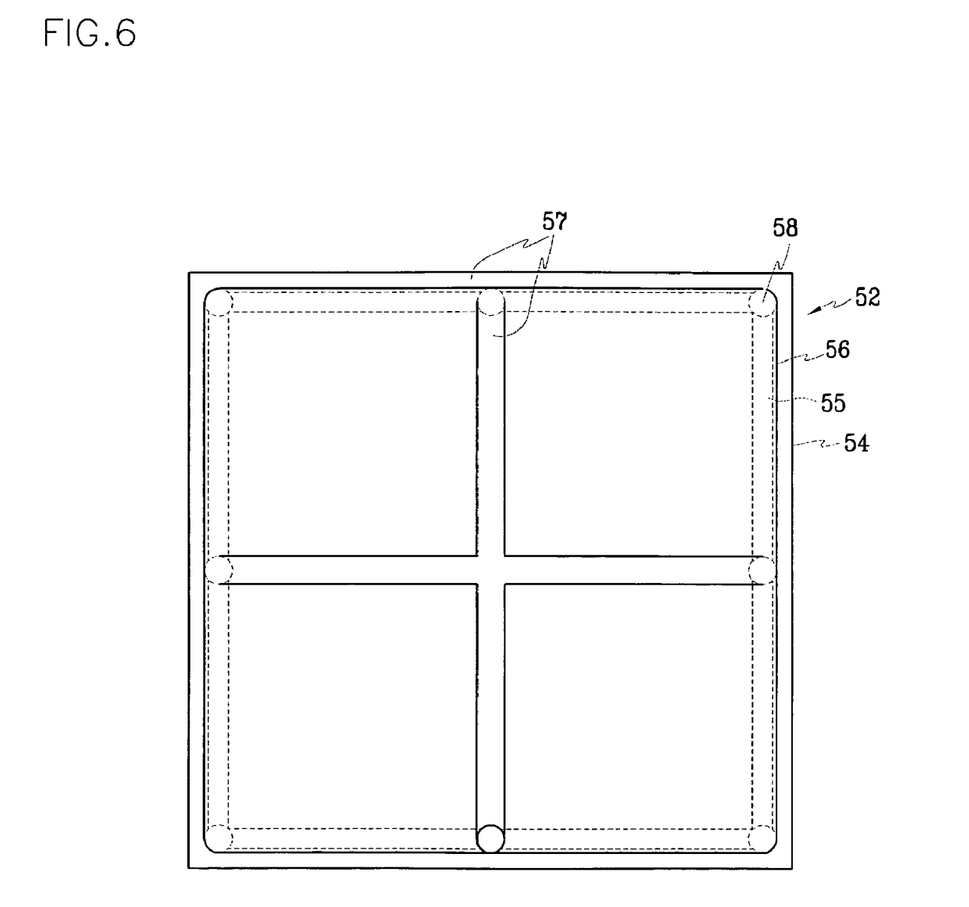
FIG. 6 is a bottom view of a pad attached on an absorption glass of a mask supporting apparatus depicted in FIG. 2.

That is, as shown in FIG. 6, the absorption pad 57 can be formed in lateral and longitudinal directions on a bottom surface of the absorption glass 54 as well as on the edge of the absorption glass 54. At this point, the absorption pad 57 is formed of a transparent material allowing light to pass. The vacuuming work can be quickly realized by the absorption pad 57 disposed as in the above.

Figure 7:
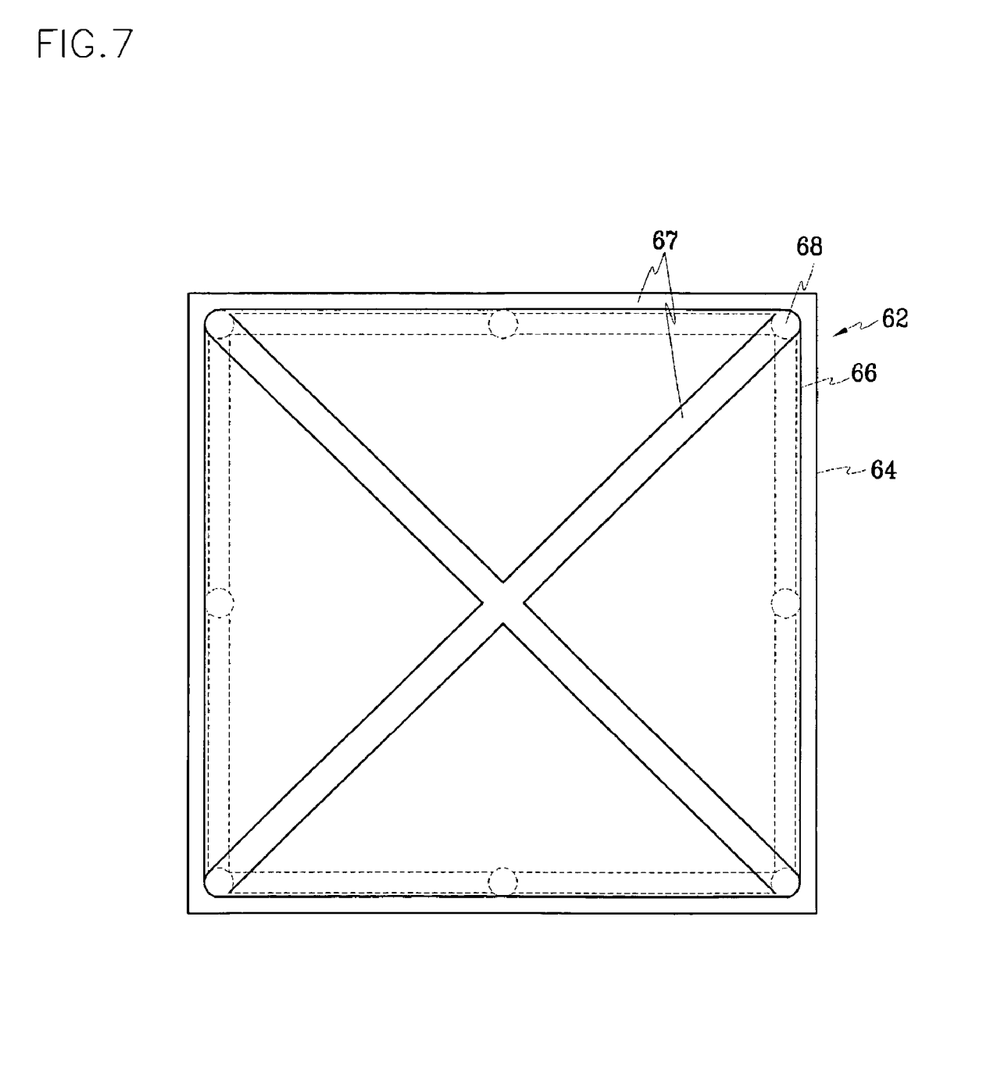
FIG. 7 is a bottom view of a modified example of FIG. 6.

Alternatively, as shown in FIG. 7, an absorption pad 67 can be diagonally formed on the bottom surface of the absorption glass 64 as well as the edge of the absorption glass 64.

A light exposing process using the above-described mask supporting unit 12 of the present invention will be described hereinafter.

Figure 8:
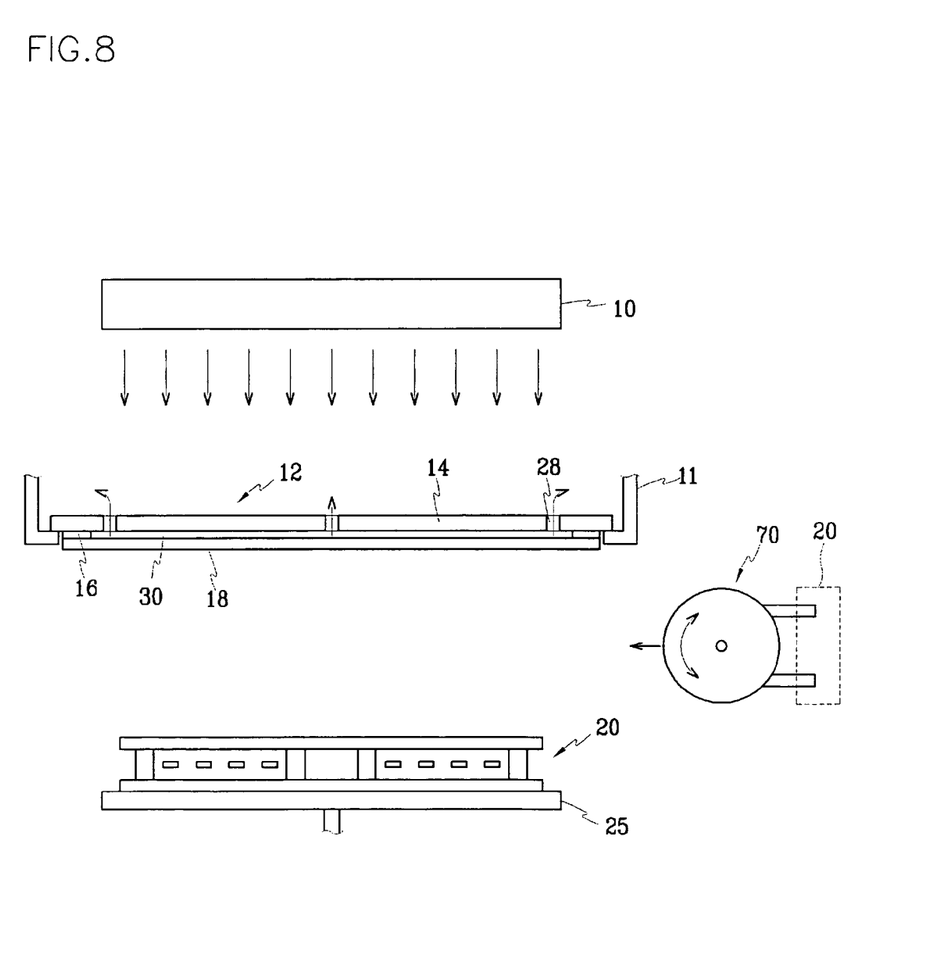
FIG. 8 is a flowchart illustrating a light exposing process using a mask supporting apparatus according to an embodiment of the present invention.
Figure 9:
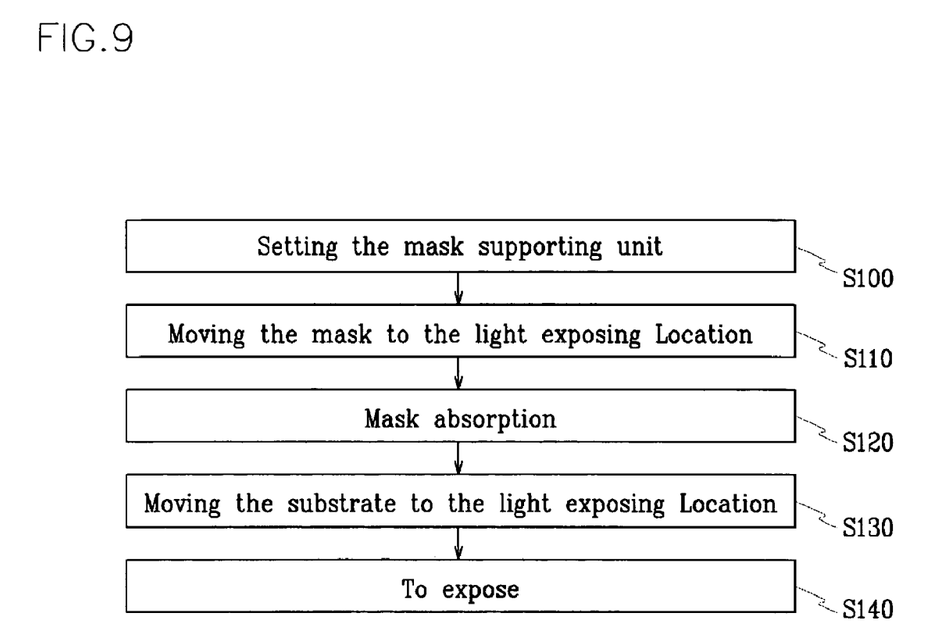
FIG. 9 is a flowchart illustrating a light exposing process using a mask supporting apparatus according to another embodiment of the present invention.

As shown in FIGS. 8 and 9, a mask supporting unit 12 is first set (S100). That is, an absorption glass 14 provided with the vacuum holes 28 is disposed on a fixing jig 11. At this point, since the jig 11 is accurately located, by simply seating the absorption glass 14 on the fixing jig 11, the setting of the mask supporting unit 12 can by completed. The absorption pad 16 is attached on the absorption glass 14.

Accordingly, the mask 18 can be attached on the absorption glass 14 by the absorption pad 16 in a following process.

Then, the mask 18 is aligned to the light exposing location (S110). That is, the mask 18 is moved to a lower portion of the fixing jig by a conventional robot 70 and abutted on the absorption pad 16. At this point, the space 30 is defined by the absorption pad 16 between the absorption glass 14 and the mask 18.

Next, the mask absorption process is performed (S120). That is, the vacuum pump is connected to the vacuum holes 28 and the vacuuming work proceeds.

When the air in the space 30 is exhausted through the vacuum hole 28, the mask 18 is attracted to the absorption glass 14. At this point, since the absorption pad is attached on the absorption glass 14, the mask 18 is securely attached on the absorption glass 14.

Then, the substrate 20 is displaced to the light emitting location (S130). That is, by a conveying member (not shown), the substrate 20 is conveyed to a device 25 and the device 25 is elevated to dispose the substrate in the light exposing location.

When the substrate 20 is disposed on the light exposing location, the light source 10 emits light. The light passes through the mask 18 having a predetermined pattern and reaches the substrate 20 to harden, for example, the seal material.

As described above, the mask can be securely supported by vacuum without using any other supporting members.

Since the supporting members are not used, the light refraction that may be caused by the supporting members can be prevented.

It will be apparent to those skilled in the art that various modifications and variations can be made in the present invention. Thus, it is intended that the present invention covers modifications and variations of this invention provided they come within the scope of the appended claims and their equivalents.

What is claimed is:

1. A mask supporting apparatus comprising;
   an absorption glass provided with at least one vacuum hole;
   a mask provided with a predetermined pattern and attached on a bottom surface of the absorption glass, the absorption glass being provided at the bottom surface with lateral and longitudinal grooves; and
   an absorption pad disposed between the absorption glass and the mask to define a space between the absorption glass and the mask,
   wherein air in the space is exhausted through the vacuum hole to securely fix the mask on the absorption glass.

2. The mask supporting apparatus of claim 1, wherein the absorption glass is formed of a material selected from the group consisting of quartz and Soda lime.

3. The mask supporting apparatus of claim 1, wherein the absorption glass is provided at the bottom surface with diagonal grooves.

4. The mask supporting apparatus of claim 1, wherein the absorption glass and the absorption pad are formed of a transparent material through which ultraviolet rays can pass.

5. The mask supporting apparatus of claim 1, wherein the absorption pad is attached on the bottom surface of the absorption glass in lateral and longitudinal directions.

6. The mask supporting apparatus of claim 1, wherein the absorption pad is attached on the bottom surface of the absorption glass in diagonal directions.

7. A mask supporting apparatus comprising:
   an absorption glass provided with at least one vacuum hole;
   a mask provided with a predetermined pattern and attached on a bottom surface of the absorption glass, the absorption glass being provided at the bottom surface with diagonal grooves; and
   an absorption pad disposed between the absorption glass and the mask to define a space between the absorption glass and the mask,
   wherein air in the space is exhausted through the vacuum hole to securely fix the mask on the absorption glass.

8. The mask supporting apparatus of claim 7, wherein the absorption glass is formed of a material selected from the group consisting of quartz and Soda lime.

9. The mask supporting apparatus of claim 7, wherein the absorption glass and the absorption pad are formed of a transparent material through which ultraviolet rays can pass.

10. The mask supporting apparatus of claim 7, wherein the absorption pad is attached on the bottom surface of the absorption glass in lateral and longitudinal directions.

11. The mask supporting apparatus of claim 7, wherein the absorption pad is attached on the bottom surface of the absorption glass in diagonal directions.

* * * * *